United States Patent [19]
Anderson et al.

[11] Patent Number: 6,005,631
[45] Date of Patent: Dec. 21, 1999

[54] METHODS AND APPARATUS FOR ORGANIZING AND SEARCHING AN ELECTRONIC PROGRAMMING GUIDE

[75] Inventors: Bruce A. Anderson, San Diego; Peter B. Houser, Poway, both of Calif.

[73] Assignee: Scientific-Atlanta, Inc., Norcross, Ga.

[21] Appl. No.: 08/979,768

[22] Filed: Nov. 26, 1997

Related U.S. Application Data

[60] Provisional application No. 60/031,528, Nov. 29, 1996.

[51] Int. Cl.$^6$ .................................................. H04N 7/173
[52] U.S. Cl. ....................... 348/460; 348/552; 348/553; 348/563; 348/906; 348/13
[58] Field of Search ..................................... 348/460, 906, 348/564, 552, 553, 563, 569, 7, 12, 13; 455/5.1, 4.2; H04N 7/16, 7/173

[56] References Cited

U.S. PATENT DOCUMENTS

| | | | |
|---|---|---|---|
| 4,706,121 | 11/1987 | Young | 358/142 |
| 5,353,121 | 10/1994 | Young et al. | 348/563 |
| 5,479,266 | 12/1995 | Young et al. | 348/906 |
| 5,481,296 | 1/1996 | Cragun et al. | 348/13 |
| 5,541,738 | 7/1996 | Mankovitz | 348/906 |
| 5,559,548 | 9/1996 | Davis et al. | 348/906 |
| 5,579,055 | 11/1996 | Hamiltom et al. | 348/460 |
| 5,585,838 | 12/1996 | Lawler et al. | 348/906 |
| 5,585,866 | 12/1996 | Miller et al. | 348/906 |
| 5,592,551 | 1/1997 | Lett et al. | 348/906 |
| 5,596,373 | 1/1997 | White et al. | 348/906 |
| 5,630,119 | 5/1997 | Aristides et al. | 348/906 |
| 5,635,978 | 6/1997 | Alten et al. | 348/906 |
| 5,635,989 | 6/1997 | Rothmuller | 348/906 |
| 5,652,613 | 7/1997 | Lazarus et al. | 348/906 |
| 5,666,645 | 9/1997 | Thomas et al. | 348/906 |
| 5,694,176 | 12/1997 | Bruette et al. | 348/563 |
| 5,699,107 | 12/1997 | Lawler et al. | 348/13 |

*Primary Examiner*—Michael H. Lee
*Assistant Examiner*—Jean W. Désir
*Attorney, Agent, or Firm*—Kenneth M. Massaroni; Hubert J. Barnhardt III; Kelly A. Gardner

[57] ABSTRACT

A single program descriptor is assigned to each program in electronic programming guide (EPG) data which is transmitted to home communications terminals in a communications network. A relationship is then separately established between these descriptors and criteria which may be used by a subscriber to search the EPG data for programs of interest to that subscriber. Data for defining this relationship is also stored in the home communications terminal. The subscriber may then provide one or more of the above-mentioned criteria to search the EPG data for programs meeting the criteria. The programs which are determined to meet the criteria may be displayed on the television of the subscriber.

14 Claims, 11 Drawing Sheets

- *Movies*
  - *All*
  - *Action*
  - *Comedy*
  - *Western*

- *Sports*
  - *All*
  - *Football*
  - *Basketball*

- *Comedy*
  - *All*
  - *Movies*
  - *Sitcom*

|  |  |  | 64 |  |  | 60 |  |  |
|---|---|---|---|---|---|---|---|---|
| | 03/05 | | 7:00PM | | 7:30PM | | 8:00PM | | 8:30PM | |
| | WXIA 14 | | HOLLYWO SQUARES | | GILLIGANS ISLAND | | BRADY BUNCH | | TOM AND JERRY | |
| | HBO 15 | | TERMINATOR 2 [R] [CC] | | | | HOME ALONE [PG] [CC] | | |
| | CMAX 16 | | TERMINA- TOR 2 | | WRESTLING | | | | |
| | ESPN 17 | | GOLF | | WIMBLEDOM | | | | BOWLING | |
| | SHOW 18 | | BAD NEWS BEARS [PG] | | | | | | CITIZEN KANE | |
| | TMC 19 | | ONE GOOD COP [R] | | | | | | INVISIBLE MAN | |
| | CURRENT TIME: 7:15PM  CURRENT DATE: 03/05 | |
| | PRESS [INFO] FOR DETAILS, [SELECT] TO TUNE. PRESS [MENU] TO EXIT. | |

| PROGRAM | PROGRAM DESCRIPTOR |
|---|---|
| TRUE GRIT | TRUE GRIT |
| UNFORGIVEN | TRUE GRIT |
| BLAZING SADDLES | BLAZING SADDLES |
| SEINFELD | SEINFELD |
| MAD ABOUT YOU | SEINFELD |
| I LOVE LUCY | I LOVE LUCY |
| THE HONEY MOONERS | I LOVE LUCY |

*FIG. 6B*

| PROGRAM DESCRIPTOR | SEARCH CRITERIA |
|---|---|
| TRUE GRIT | MOVIE, WESTERN |
| BLAZING SADDLES | MOVIE, WESTERN, COMEDY |
| SEINFELD | COMEDY, SERIES |
| I LOVE LUCY | COMEDY, SERIES, CLASSIC TV |

METHODS AND APPARATUS FOR ORGANIZING AND SEARCHING AN ELECTRONIC PROGRAMMING GUIDE

CROSS REFERENCE TO RELATED APPLICATIONS

This application claims priority to provisional U.S. patent application Ser. No. 60/031,528, filed Nov. 29, 1996 in the names of Bruce Anderson and Peter B. Houser, entitled "METHOD AND APPARATUS FOR ORGANIZING AND SEARCHING AN ELECTRONIC PROGRAMMING GUIDE".

BACKGROUND OF THE INVENTION

1. Technical Field

The present invention generally relates to methods and apparatus for organizing and searching a database and, more particularly, to methods and apparatus for organizing and searching an electronic programming guide.

2. Description of Related Art

It is known in the art to provide an electronic program guide (EPG) which provides the viewer with an on-screen listing of the upcoming television programs on television channels available to the viewer. In one implementation, the EPG is provided by an EPG data service and the EPG data is converted into a video signal at the cable head end and transmitted to the viewer's television via a dedicated cable television channel. After tuning to the dedicated cable television channel, the viewer must then passively wait until the program information for the desired time period and/or channel is displayed. This technique provides no mechanism for allowing the viewer to scroll through the EPG to the desired listing. Moreover, this technique also requires the cable head end operator to dedicate a separate cable television channel to the EPG data and to create video signals from the EPG data provided by the EPG service provider.

In another implementation, the EPG data is transmitted to subscribers using either in-band or out-of-band signaling. The subscriber's home communication terminal recovers the EPG data and stores the data until the subscriber requests presentation of the EPG data on his/her television. Upon selection of the EPG data, the EPG is displayed on the subscriber's television overlaid on or in place of the video programming. Since the EPG is stored locally at the subscriber's television, the subscriber may scroll through the program information in the EPG until the desired listing is reached.

Figure 1:
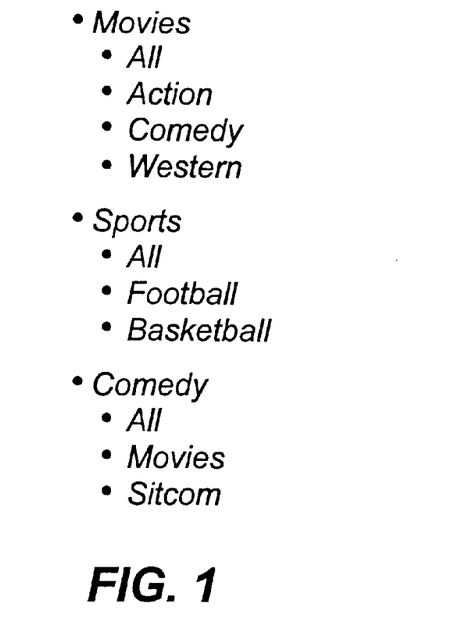
FIG. 1 is a table showing some categories to which programs may be assigned.

When implementing such an EPG, it is useful to attach descriptors to each program. Typical descriptors (also referred to as "categories") include "movies", "sports", "comedy", and "western", as well as many others. The subscriber may display a list of programs which is limited to those programs matching a specified descriptor. FIG. 1 is a list of categories which includes "movies", "sports", and "comedy". Each of these categories has one or more subcategories. For example, "all", "action", "comedy", and "western" are subcategories of the main category "movies" and "all", "movie", and "sitcom" are subcategories of the main category "comedy". A program such as "Blazing Saddles" would appear under the categories movies:all; movies:comedy; movies:western; comedy:all; and comedy::movies. This may be implemented by assigning to "Blazing Saddles" the descriptors "movies", "comedy" and "western", and then placing the program in those categories which intersect with one of the descriptors. However, assigning each program to a plurality of categories increases the amount of data which must be transmitted to subscribers. While the data to be transmitted can be reduced by requiring that each program be assigned to at most one category, such an arrangement limits the flexibility with which a subscriber may search the EPG to find programs of interest. Accordingly, it would be desirable to provide methods and apparatus which minimize the amount of information which must be transmitted to subscribers, but nonetheless provides flexibility for searching the EPG to find programs.

SUMMARY OF THE INVENTION

In accordance with one aspect of the present invention, a single program descriptor is assigned to each program in the EPG data which is transmitted to home communications terminals in a communications network. A relationship is then separately established between these descriptors and criteria which may be used by a subscriber to search the EPG data for programs of interest to that subscriber. Data for defining this relationship is also stored in the home communications terminal. The subscriber may then provide one or more of the above-mentioned criteria to search the EPG data for programs meeting the criteria. The programs which are determined to meet the criteria may be displayed on the television of the subscriber.

These and other features and aspects of the invention will be more clearly understood and better described if the following detailed description is read in conjunction with the appended drawings.

DETAILED DESCRIPTION

Figure 2:
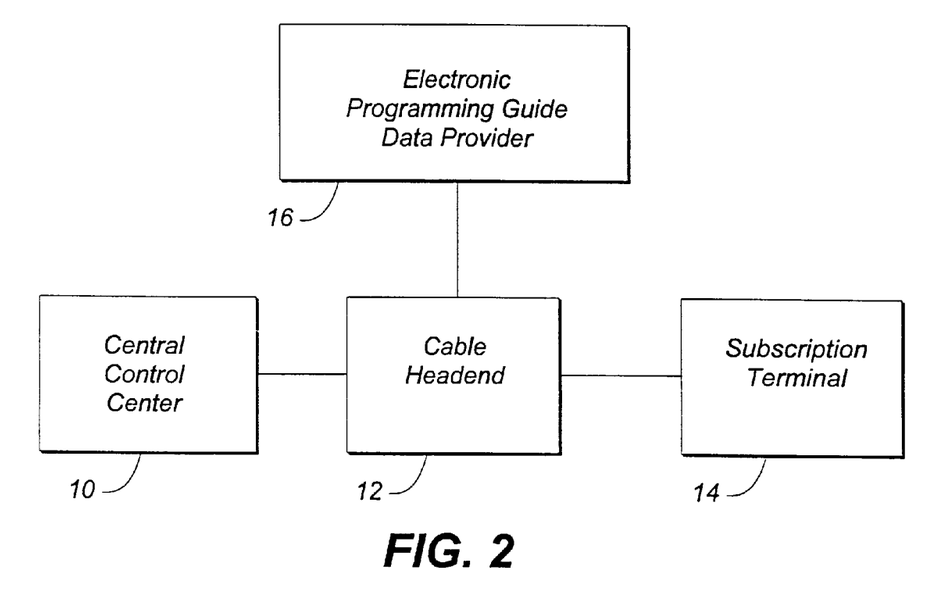
FIG. 2 shows a generalized block diagram of a subscription television system in which the present invention may be implemented.

FIG. 2 shows a generalized block diagram of a subscription television system in which the present invention may be implemented. The system of FIG. 2 is for exemplary purposes only and should not be construed as limiting the invention. A control center 10 controls the operation of the subscription television system. Control center 10 is often associated with the central office of a multi-service operator and may communicate with and control head ends in many cities. Head end 12 provides subscription service to a local area, e.g., one city or a region including one or more cities or towns. A home communications terminal 14 is also shown and would be located in a subscriber's home or business. Of course, in a typical subscription television system, there would be hundreds or thousands of such home communications terminals. Finally, an electronic programming guide data provider 16 for supplying television schedule information to head end 12 is shown. The lines connecting central control location 10 to head end 12 and electronic programming guide data provider 16 to head end 12 indicate communication paths. Data may be communicated along those paths by any known means including telephone networks, satellite transmissions, optical fibers, coaxial cables, or other transmission lines. A distribution system connects head end 12 to each home communications terminal 14. The distribution system generally includes transmission lines and line extenders, and may also include coaxial cables, optical fibers, satellite uplinks and downlinks, other broadband transmission paths and combinations thereof.

Figure 3:
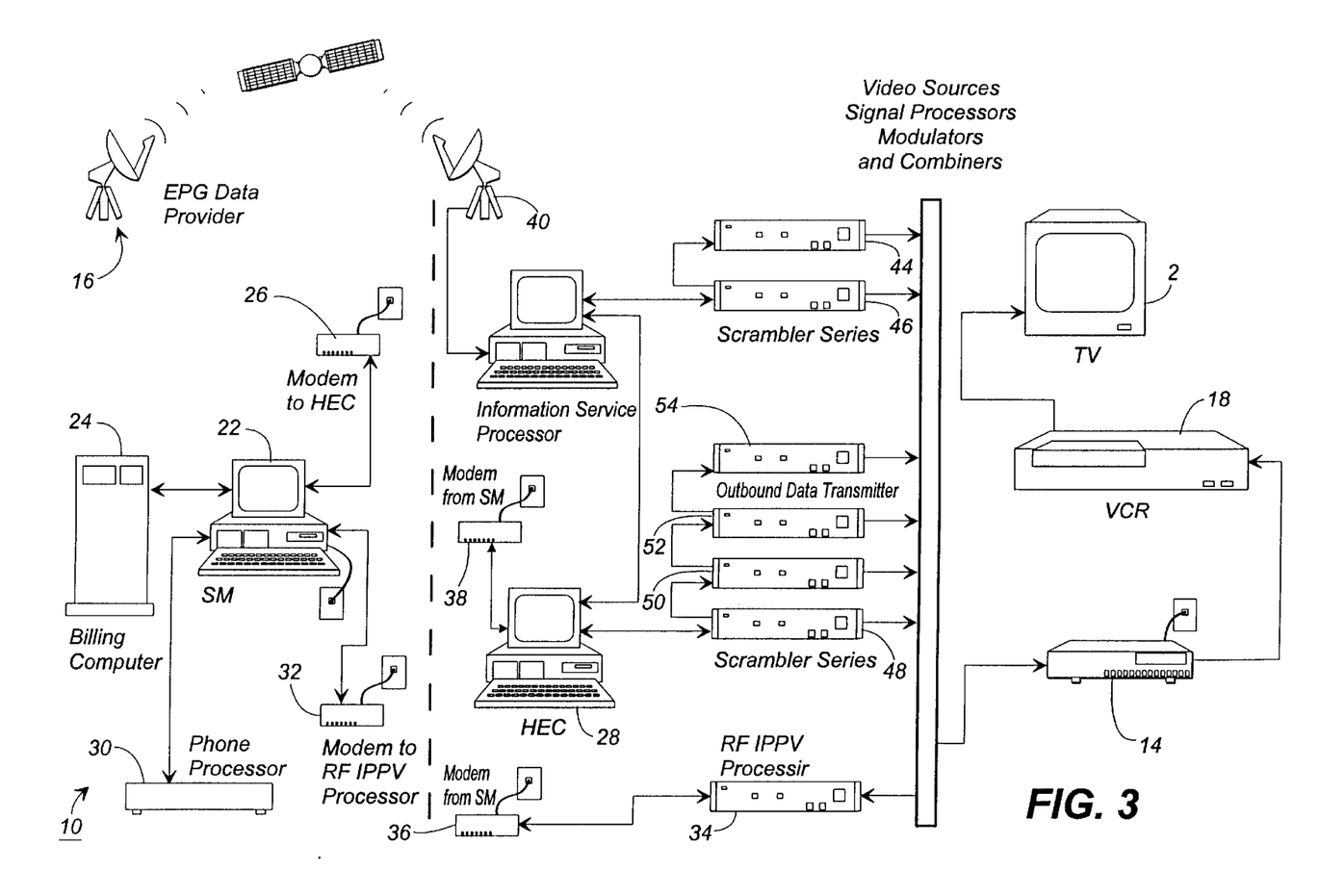
FIG. 3 is a more detailed diagram of the subscription television system of FIG. 2.

A more detailed diagram of a subscription television system in which the present invention may be implemented is shown in FIG. 3. As noted above, it will be appreciated the present invention may be implemented in other systems such as satellite systems, broadcast systems, local area networks (LANs), wide area networks (WANs), and the like. On the left side of the dotted line is shown EPG data provider 16 and control center 10. In the center portion of FIG. 3, head end 12 is shown in detail. Finally, the right portion of FIG. 3 shows a home communications terminal 14 and associated equipment (VCR 18 and television 20).

As shown in FIG. 3, EPG data provider 16 transmits EPG data by satellite to head end 12. The data includes program information arranged by time and channel. Various companies provide such data, which may be purchased by subscription television system operators and provided to their subscribers.

Control center 10 includes a system control computer 22 that directs the other components of control center 10. One example of a system control computer 22 is the System Manager X, available from Scientific-Atlanta, Inc. of Norcross, Ga. Control center 10 may, for example, provide billing services for the provider, including billing for pay-per-view events. A billing computer 24 stores billing data and may also format and print bills. Modems 26 and 38 allow data transmissions between system control computer 22 and a head end controller ("HEC") 28. For example, authorization data may be transmitted from system control computer 22 to HEC 28. HEC 28 formats the authorization data and transmits it to the home communications terminals either in-band through scramblers 48, 50, or 52 or out-of-band through out-of-band data transmitter 54. One example of a head end controller is the Model 8658, available from Scientific-Atlanta, Inc. of Norcross, Ga. Billing data from the subscribers can be received through either phone processor 30 or modem 32. Home communications terminal 14 can either transmit billing data over a telephone line directly to a phone processor 30 or back up the cable to an RF IPPV processor 34, depending on its configuration. In this regard, home communications terminal 14 can include either a phone communication module or an RF communication module. If the data is sent to RF IPPV processor 34, it is sent by modem 36 associated with RF IPPV processor 34 to modem 32 associated with system control computer 22. System control computer 22 accumulates the billing data from phone processor 30 and modem 32 and provides it to billing computer 24 so that customers may be billed for their program services.

Turning now to the head end 12, the EPG data is received by a satellite receiver 40 and passed to an information service processor ("ISP") 42. ISP 42 may also receive text data for transmission to subscribers. The text data may include, but is not limited to, weather information, sports scores, messages, and the like and may be provided by an information services provider or generated by the cable service provider. ISP 42 is responsible for receiving the EPG data as well as the other data, and transmitting it to the subscribers. ISP 42 provides data to scramblers 44 and 46. Of course, the actual number of scramblers to which the ISP provides data would depend on many factors, including the amount of data to be transmitted and the speed at which the data must be supplied and updated. The EPG and text data is repetitively sent out by the scramblers. If there is only one scrambler and a large amount of data, the repetition rate will be slow. Use of more than one scrambler allows the data repetition rate to increase. The two scramblers 44 and 46 of FIG. 2 are for exemplary purposes only. Preferably, scramblers 44 and 46 are daisy-chained so that the scramblers may be addressed individually or globally. Similarly, scramblers 48, 50, 52, and out-of-band data transmitter 54 may be daisy-chained.

Scramblers 44 and 46 place in-band data for transmission to subscribers, along with scrambling an associated television channel. The EPG data and text data may be placed in the vertical blanking interval or elsewhere in the television channel. For example, the data could be amplitude modulated onto the sound carrier as is known in the art. A 6 megahertz (MHZ) NTSC analog television signal is considered by way of example, but the invention is not limited in this respect. The television signal may be in PAL or SECAM format, digital or digitally compressed data, or may comprise a wider bandwidth high definition television signal. As described herein, in-band transmission means the transmission of data within the television channel comprising both audio and video carriers. The data may be transmitted by amplitude modulation on the sound carrier, hereinafter "in-band audio data", or in the video signal during unused portions such as data channels of an MPEG compressed video data stream or the vertical or horizontal blanking periods of an analog television signal.

The EPG data received by satellite receiver 40 will often be very extensive, containing data for programs up to one or two weeks in advance. If all this data is to be transmitted to home communications terminal 14, the terminal must be able to store the data in its memory. To store that much information requires a significant amount of memory. Providing extra memory in home communications terminals is expensive because of the hundreds or thousands of such terminals that are in a typical cable system. Frequently, customers may prefer a less expensive unit that provides only a portion of the data supplied by EPG data provider 16, such as the next few hours. The customers can then benefit from lower cable service bills or purchase expenses if customers are to own the terminals. Thus, ISP 42 is provided with the capability of selecting only certain portions of the EPG data to be transmitted to subscribers. ISP 42 receives the EPG data, selects the portion to be transmitted to subscribers and passes only that portion to a scrambler (44 and/or 46). By selecting only a portion of the data provided by EPG data provider 16, less data is transmitted than would otherwise be the case. Thus, the data repetition rate is increased. Not only may ISP 42 select portions of the EPG data, but it may also add data on local stations not covered by EPG data provider 16. ISP 42 may also reformat the data in such a way as to make it more pleasing to the subscribers.

As stated above, the EPG data is preferably transmitted in the vertical blanking interval of at least one of the television signals. EPG data is constantly being transmitted in the vertical blanking interval by the scramblers. Scramblers 44 and 46 have memory dedicated to storing the EPG data. The amount of memory depends on the amount of EPG data to be transmitted to the subscribers. If the ISP is going to select only a small portion of the EPG data provided by the EPG data provider, e.g., a few hours, then a small memory, perhaps 128 kb, may be sufficient. For larger segments, 512 kb may be necessary. And, for a couple of weeks of programming data, 1 Mb may be required. The ISP periodically updates the scrambler memory with new data received from the EPG data provider 16. ISP 42 tags the data as either long term or short term, depending on whether the data concerns a shortly upcoming program or a more distant one. The scrambler sends out the short term data more frequently than the long term data. This is because the EPG is stored in memory at the home communications terminal 14, and must be updated frequently. But the home communications terminal is not constantly tuned to the channel where the EPG data is located. As will be described later, home communications terminal 14 tunes to the EPG data channel whenever possible to obtain update information. By sending out short-term data very frequently, it is likely that a given home communications terminal will have accurate short-term data stored in it, which is the most important data to a user of the home communications terminal. Long term data is sent out less frequently. Programming changes may also be grouped with the short term data.

As discussed above, ISP 42 may also receive text data from an information service provider, such as a stock quote service. ISP 42 can also generate text locally. For example, ISP 42 may generate messages for transmission to subscribers concerning upcoming events or service interruptions or changes. If received from an information service provider, the text data may either by transmitted as received or reformatted by ISP 42, then transmitted to a scrambler (44 or 46) for transmission to subscribers.

ISP 42 also passes data to head end controller ("HEC") 28, which controls scramblers 48, 50, and 52, and also out-of-band data transmitter 54. The scramblers 48, 50, and 52 scramble television signals and may also insert in-band data. The out-of-band data transmitter 54 transmits data on a separate carrier, i.e., not within a television channel. In one embodiment, the out-of-band carrier is at 108.2 MHZ, but other out-of-band carriers may also be used. The data transmitted under the control of HEC 28 may be, for example, descrambling information. In one embodiment, data is inserted in each vertical blanking interval to indicate the type of scrambling employed in the next video field. Scrambling systems are well known in the art. For example, sync suppression scrambling, video inversion scrambling, and the like or some combination of scrambling techniques may be used. Further, authorization information for authorizing the reception of certain channels or programs may also be transmitted. Data may also be transmitted over non-scrambled channels either as in-band audio or video data via data repeaters (not shown) such as a Model 8556-100 data repeater available from Scientific-Atlanta, Inc. of Norcross, Ga.

Some of the information transmitted is global, i.e., every subscriber receives it. For example, descrambling information may be a global transmission. Note that just because each subscriber receives the descrambling information does not mean that each home communications terminal can descramble a received signal. Rather only authorized home communications terminals are capable of descrambling the received signal. On the other hand, data transmissions may be addressed transmissions. For example, authorization data is normally addressed to individual subscribers. That is, when transmitted, the data will have an address (for example, a home communications terminal serial number) associated with it. The addressed home communications terminal receives the data and responds accordingly. Other home communications terminals will ignore the data. Further, there can be group addressed data, which will affect groups of subscribers. The outputs of scramblers 44, 46, 48, 50, and 52 and out-of-band data transmitter 54 are passed to any necessary processing equipment such as signal processors, modulators, and combiners. These elements are generally indicated as block 56. A distribution system 58 leads to a home communications terminal 14.

At the subscriber location, a home communications terminal 14 is found. Home communications terminal 14 may be connected to the subscriber's video equipment including, for example, a VCR 18 and a television 20. Multiple home communications terminals may be located at a premises with several televisions 20.

Figure 4A:
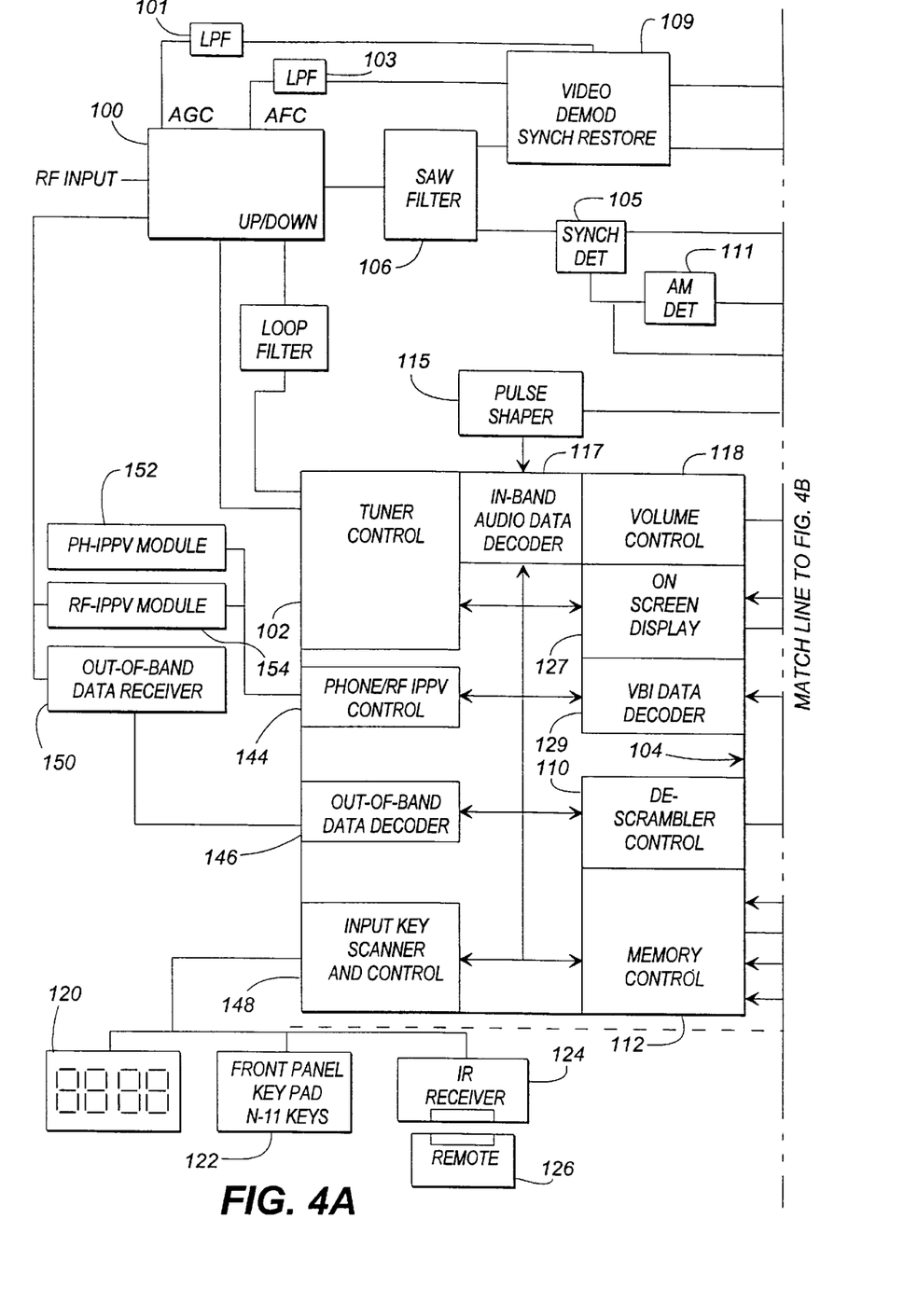
FIGS. 4A and 4B are a detailed block diagram of one of the home communications terminals of the system illustrated in FIG. 2.
Figure 4B:
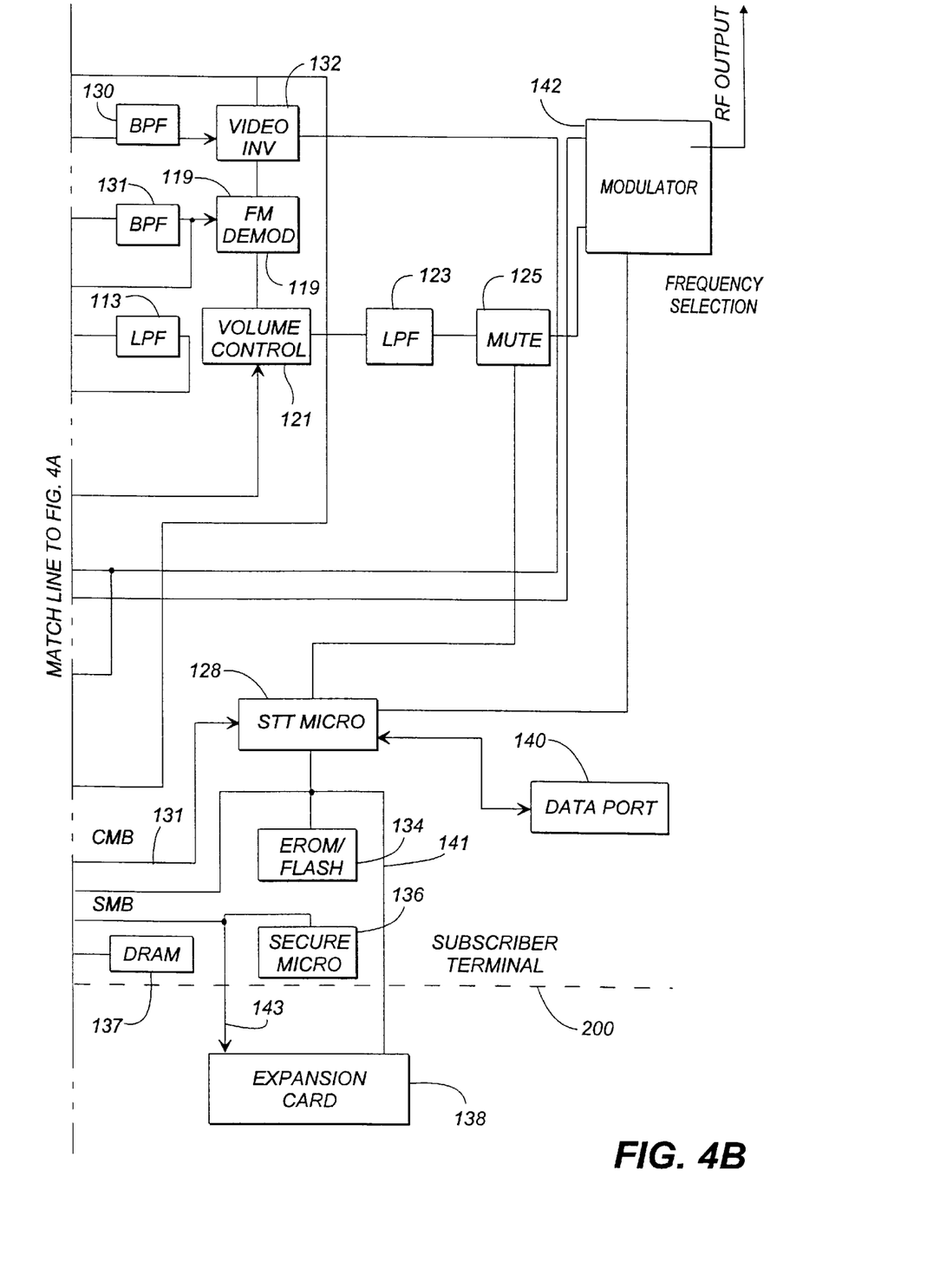

Referring to FIGS. 4A and 4B a detailed block diagram of home communications terminal 14 now be described. The broadband television signal from signal distribution system 58 is received at the input of up/down converter or tuner 100. An out-of-band data receiver 150 is also coupled to the broadband input. Conventionally, up/down converter 100 may include an input filter, such as a diplexer, to separate the 108.2 MHZ out-of-band signal and the broadband television signal. Up/down converter 100 can be tuned to a predetermined channel for receiving in-band video and audio data when not in use. The channel may be predetermined from system control computer 22 and, by one of the data transmission methods described herein, the predetermined channel identification can be stored in home communications terminal 14.

When in use, up/down converter 100 is tuned according to a channel entered by a subscriber via a user interface having an IR receiver 124, remote control 126 and terminal keypad 122. Up/down converter 100 uses a phase locked loop under the control of a tuner control 102 to convert the selected or predetermined default RF channel signal to a 45.75 MHZ intermediate frequency (IF) signal. A multifunction control circuit (MCC) 104, preferably an application specific integrated circuit (ASIC) combining many terminal control and data handling functions into a single package, is linked to up/down converter 100 by a bidirectional link to tuner control 102. The link has one path for tuning and a return link for feedback control of the tuning process. A feedback signal for automatic gain control and one for automatic frequency control are transmitted to up/down converter 100 through filters 101, 103, respectively from a video demodulator 109.

A filter, such as a SAW filter 106, filters the IF channel signal to split the signal into separate video and audio portions for further processing. The video portion is demodulated and descrambled by video demodulator 109 under the control of a descrambler control 110 of MCC 104. Video demodulator 109 performs the sync restoration (descrambling of the video signal) for sync suppression scrambling. The video signal then passes through a band pass filter 130 and to a video inverter 132 where inverse video inversion (descrambling) takes place. The descrambling of the video portion, whether sync suppression, sync inversion, video line inversion, etc. is under the control of descrambler control 110 of MCC 104. Descrambler control 110 provides the necessary timing signals, inversion axis levels, and whether the video is inverted or not to video inverter 132 and supplies the necessary timing, restoration levels and identification of sync pulses to be restored to demodulator 109. Descrambler control 110 usually receives such descrambling information from pulses as in-band audio data.

In the other path, the audio signal is converted from the 41.25 MHZ IF carrier to the intermodulation frequency of 4.5 MHZ by a synchronous detector 105. Feedback for automatic gain control of detector 105 is supplied from the output of a band pass filter 131. The audio signal may then be demodulated by an FM demodulator 119. An amplitude modulation detector 111 performs pulse detection to recover the in-band audio data which are amplitude modulated onto the audio carrier. The recovered in-band pulses are supplied to an in-band audio data decoder 117 of MCC 104 for processing after being shaped by a pulse shaper 115. The in-band data, except for descrambling data, is stored in a DRAM 137 for buffering. Descrambler control 104 accesses descrambling data directly for the video descrambling operation. Volume control of the audio signal is performed under the control of a volume control 118 of MCC 104 and a microprocessor 128 as described in U.S. Pat. No. 5,054,071, incorporated herein by reference. After volume control, the audio signal is passed through a low pass filter 123 and a mute switch 125. The output of mute switch 125 is applied to a modulator 142.

MCC 104 receives the video signal after demodulation and descrambling and strips the in-band video data from the VBI of the signal with a VBI decoder 129. The in-band video data is transmitted at a frequency on the order of known teletext systems, such as about 4.0 megabits per second, and a data clock provides an appropriate sampling frequency higher than the Nyquist rate according to well known techniques. In-band decoder 129 stores the data in DRAM 137 prior to processing by microprocessor 128, DRAM 137 serving as a data buffer.

The output of video inversion circuit 132 is also supplied to an on-screen display control 127 of MCC 104. On-screen display control 127 selectively generates on-screen character and graphic displays in place of or overlaid on the video signal. Modulator 142 combines the video signal from the output of on-screen display control 127 and the audio signal from the output of mute circuit 125 and converts the combined signal to the channel frequency selected by microprocessor 128, such as channel ¾ for NTSC. The combined and remodulated signal is supplied as an RF output to a television receiver in well known manner.

Control microprocessor 128 controls the overall operation of the home communications terminal 14. The subscriber communicates to and controls microprocessor 128 through an interactive user interface with an on screen display. The user interface includes a keyboard 122 on the front panel of home communications terminal 14 and a remote control 126 which generate subscriber control signals for channel tuning, volume level control, feature selection, and the like. These subscriber control commands are decoded by an input scanner and control 148 of MCC 104. A remote IR receiver 124 of the user interface receives the commands from the infrared (IR) or other remote control 126, as is well known in the art, and provides commands to microprocessor 128. The user interface additionally includes a 4 digit, 7 segment LED display 120 which displays the tuned channel numbers and diagnostics.

When keypad 122 or IR remote control 126 is utilized to select a command, microprocessor 128 operates to execute the command. For example, this operation may be to instruct tuner control 102 to appropriately control up/down converter 100 to tune a selected channel. The home communications terminal interacts with the subscriber by providing numerous on-screen displays which assist in the operation of the terminal. The on-screen displays provide information and prompts to guide the subscriber through many of the complex features of the terminal.

Descrambler control 110 of MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether descrambler control 110 of MCC 104 carries out descrambling on a particular channel or what form of descrambling is required at a particular time by interpreting the authorization and control data downloaded from system control computer 22 (by any of the three data transmission schemes discussed herein, out-of-band, in-band audio or in-band video) into the internal non-volatile memory (NVM) of the device. The NVM in secure microprocessor 136 stores secure data, for example, authorization data, scrambled channel data, scrambling mode data, some terminal configuration data and other required data.

Control microprocessor 128 operates by running a control program which preferably is partially stored in a read-only memory internal to the processor and partially stored in a non-volatile memory such as Flash EPROM memory 134. Microprocessor 128 communicates with the non-volatile memory 134 and an applications module (expansion card) 138 via a memory bus 141 which has data, address, and control lines. In addition, microprocessor 128 controls data decoders 117, 129 and 146 and tuner control 102, volume control 118, on-screen display control 127, descrambler control 110 and input key scanner and control 148 via commands through MCC 104 and control microprocessor bus (CMB) 131. Microprocessor 128 also directly controls mute switch 125 and the output frequency selection of modulator 142. Microprocessor 128 includes additional capacity for other auxiliary device communications and control through a data port 140.

Memory control 112 permits data coming from the three data decoders 117, 129 and 146 to be placed in a volatile memory such as DRAM 137. There it can be accessed by control microprocessor 128 via CMB 131. MCC 104 also distributes control instructions from control microprocessor 128 to the other parts of MCC 104 to provide operation of the rest of home communications terminal 14. MCC 104 additionally connects to a secure microprocessor bus (SMB) 143 which permits communications between secure microprocessor 136 and other portions of home communications terminal 14. SMB 143 is further coupled to applications module 138.

Memory control 112 and the microprocessor interfaces of MCC 104 are the central communications facility for control microprocessor 128 and secure microprocessor 136. Memory control 112 receives requests to write to memory or read from memory from microprocessors 128, 136 and the other controls and data decoders. It resolves contentions for memory transfers, giving priority to real time applications and the microprocessors, and schedules the data flow. Microprocessors is 128 and 136 communicate through internal registers of MCC 104 with memory control 112 and other portions of the MCC.

The home communications terminal may optionally include an impulse pay-per-view (IPPV) module of either the telephone type 152 or the RF-IPPV type 154. The IPPV module allows the subscribers to request authorization of their home communications terminal 14 to receive pay-per-view events, store the data associated with the purchase of the event in the non-volatile memory of secure microprocessor 136, and then transmit the data to system control computer 22 via the telephone return path or the RF return path via signal distribution system 58.

Figure 10:
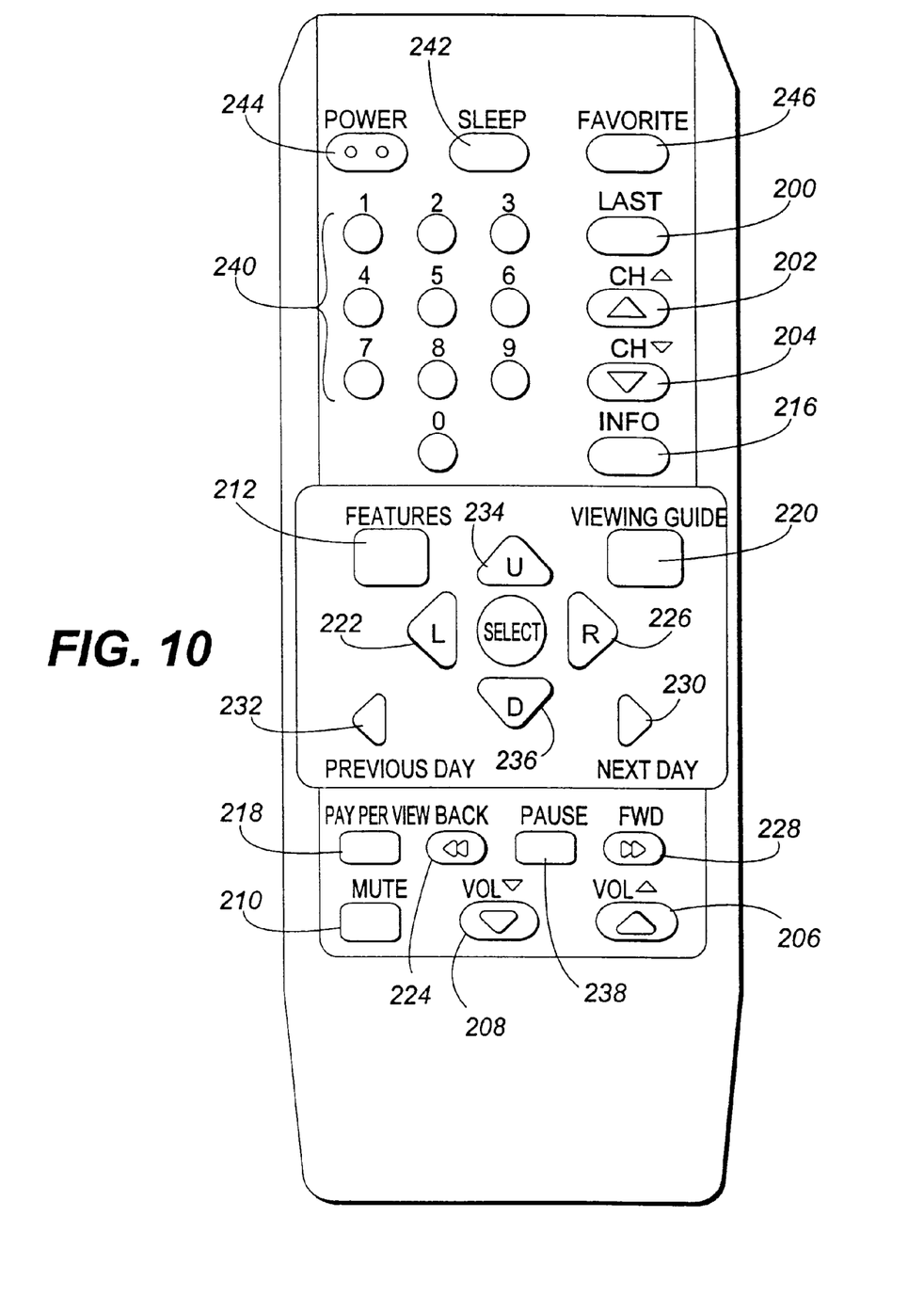
FIG. 10 illustrates the key configuration of remote control 126.

FIG. 10 illustrates the key configuration of remote control 126. The remote control keys are a part of an interactive user interface which, in combination with the onscreen displays to be described below, permit a user to access and view the EPG of the present invention. The keys direct the home communications terminal 14 to operate in the following manner.

The LAST key 200 toggles the tuning of home communications terminal 14 between the last two previously viewed channels. The CH (up) key 202 increments the channel tuned by home communications terminal 14. While in the EPG feature, this key moves the cursor down by one channel. The CH (down) key 204 decrements the channel tuned by home communications terminal 14. While in the EPG feature, this key moves the cursor up by one channel. The VOL (up)key 206 increases volume, except when the volume is muted, in which case the key restores the last volume setting. The VOL (down) key 208 decreases volume, except when the volume is muted, in which case it restores the last volume setting. The MUTE key 210 toggles the volume mute feature in which if the volume is muted, it become normal and, if the volume is normal, it becomes muted.

The MAIN MENU key 212 accesses an initial on-screen menu for accessing various features of home communications terminal 14. Examples of such features include pay-per-view programming, an EPG, messages, favorite channels, program timers, sleep timers, parental controls, terminal set-up, and the like. Such features are accessed via various sub-menus which are reached from the main menu. From within a menu, the MAIN MENU key 212 removes all on-screen menus. The SELECT key 214, in an on-screen menu, initiates actions based on menu selections which are pointed to by a cursor or highlight. For example, in an EPG, pressing SELECT key 214 will permit either tuning or recording of a program which has been highlighted within the EPG. The INFO key 216, when pressed while home communications terminal 14 is in an ON mode, causes the current time, channel number, program information (e.g., program name), and program source information (e.g., NBC, ABC, etc.) to overlay the transmitted video for a predetermined period of time (e.g., four seconds). When the key is pressed in the EPG mode, a detailed description of the highlighted program appears. PAY PER VIEW key 218 permits a subscriber to access pay-per-view program listings and to initiate a buy sequence for purchasing a pay-per-view event.

The VIEWING GUIDE key 220 accesses the EPG feature any time the terminal is on and not in another on-screen menu. From within the EPG feature, this key cancels the EPG mode. The LEFT key 222, while in the EPG mode, moves the cursor to the left 30 minutes. In an on-screen menu, this key moves the highlight bar to the left if there is more than one column of available selections. The RIGHT key 226, while in the EPG mode, moves the cursor to the right 30 minutes. In an on-screen menu, this key moves the highlight bar to the right if there is more than one column of available selections. The UP key 234, while in the EPG mode, moves the cursor up one channel. In an on-screen menu, this key moves the highlight bar up to the next available selection. The DOWN key 236, while in the EPG mode, moves the cursor down one channel. In an on-screen menu, this key moves the highlight bar down to the next available selection. The NEXT DAY key 230, while in the EPG mode, moves the entire screen to the right by one day (24 hours). The PREVIOUS DAY key 232, while in the EPG mode, moves the entire screen to the left by one day (24 hours). The BACK ARROW key 224, FORWARD ARROW key 228, and PAUSE key 238 provide for near video on demand capabilities as described in U.S. Pat. No. 5,357,276, which is incorporated herein by reference.

Remote control 126 also includes numeric keys (0–9) 240 usable for entering channel numbers, identification codes, menu selections for menus in which the selections are designated by numbers, etc. The POWER key 224 toggles the ON/OFF state of home communications terminal 14. The SLEEP key 242 permits the setting of a sleep timer and the FAVORITE key 246 permits tuning to favorite channels selected by the user.

Figure 5:
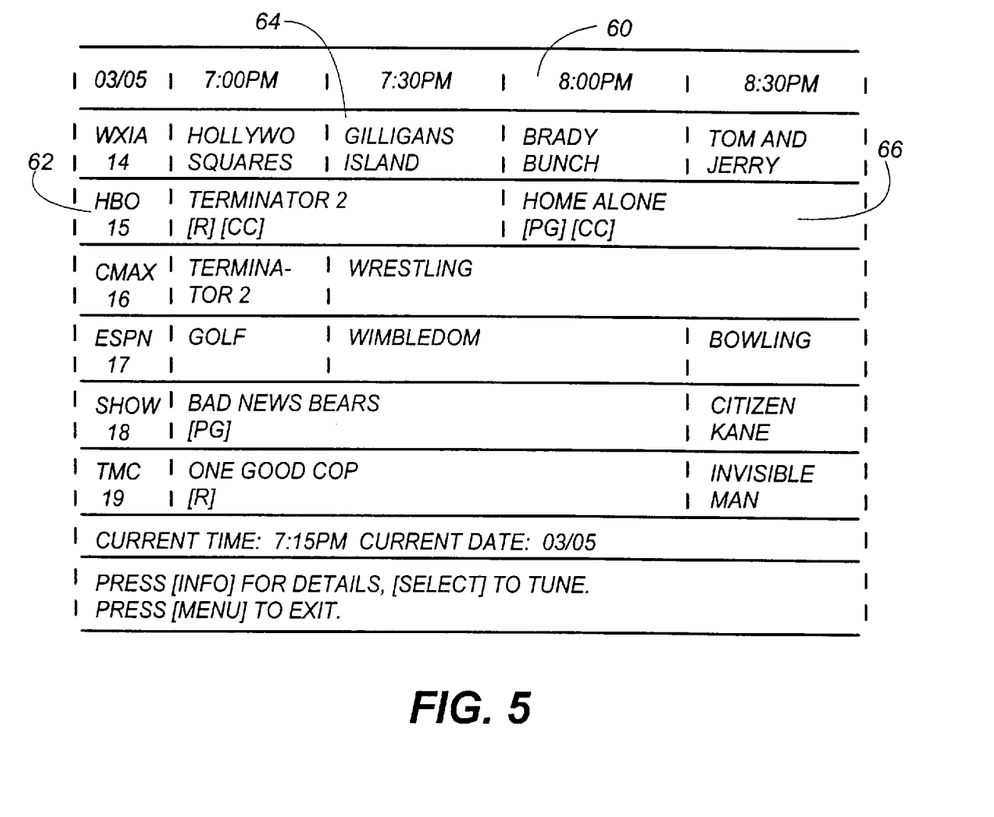
FIG. 5 illustrates an EPG.

FIG. 5 shows a screen of an EPG. The EPG is produced by the home communications terminal from data stored in its memory. The memory and memory control circuitry was described in regard to FIGS. 4A and 4B. The EPG may be activated and displayed from the home communications terminal or a remote control, such as remote control 126 shown in FIG. 4. For example, a switch on remote control 126 may be labeled as "Programming Guide" or the EPG may be selected from a menu generated by the home communications terminal and displayed on the television. Further, keyboard 122 on terminal 14 may also be used to activate the EPG.

Horizontally indicated at block 60 are date and time slots. Channel selections appear vertically on the left side of the screen. Of course, the arrangement of the channels and times could be reversed in an alternative embodiment. For example, at block 62 is found HBO, which is channel 15 in FIG. 5. The name of a television program is associated with each time slot and channel slot. For example, associated with the 7:30 p.m. time slot and channel 14 is "Gilligan's Island", shown at block 64. The channels on the left-hand side of the EPG are arranged in numerical order from top to bottom. When the EPG feature is activated, a cursor may be used to highlight a particular program. The program block will include the title, and may include other information such as ratings or an indication that the program is closed-captioned. For example, block 66 provides all of this information.

As described above, remote control 126 is preferably provided with cursor direction keys "UP", "DOWN", "LEFT" and "RIGHT". These keys move the cursor around the EPG. The cursor moves in 30-minute and one channel increments. The current placement of the cursor is indicated by a highlight at that location. The cursor placement may also be indicated by highlighting the channel and time selected at the cursor location. When the cursor reaches the edge of the screen, the entire screen is shifted one time slot each time a direction key is actuated to seek information not currently visible on the screen. Movement is similar to movement within a spreadsheet on a computer. Direct channel entry may be supported in the EPG mode. Direct channel entry moves the window to display the information on the channel the user selects and places the cursor on that channel. However, the terminal does not tune that channel unless the user selects it by actuating "SELECT" 214 key on remote control 126. Further, when the cursor is located on a program, the user may request more information on the program by activating an "INFO" key on the remote control. This will open a window giving additional information on the program, if such information is available.

When the cursor is over a program that the user would like to watch, then the "SELECT" key 214 may be actuated and that channel is tuned. Alternatively, the "SELECT" key 214 may drop the user into a menu that allows him/her to either watch the program or record it. If the watch option is chosen, the channel is tuned. If the record option is chosen, the terminal will program VCR 18 to record the program, or at least program itself to turn on and tune the proper channel when the program is available.

Figure 6A:
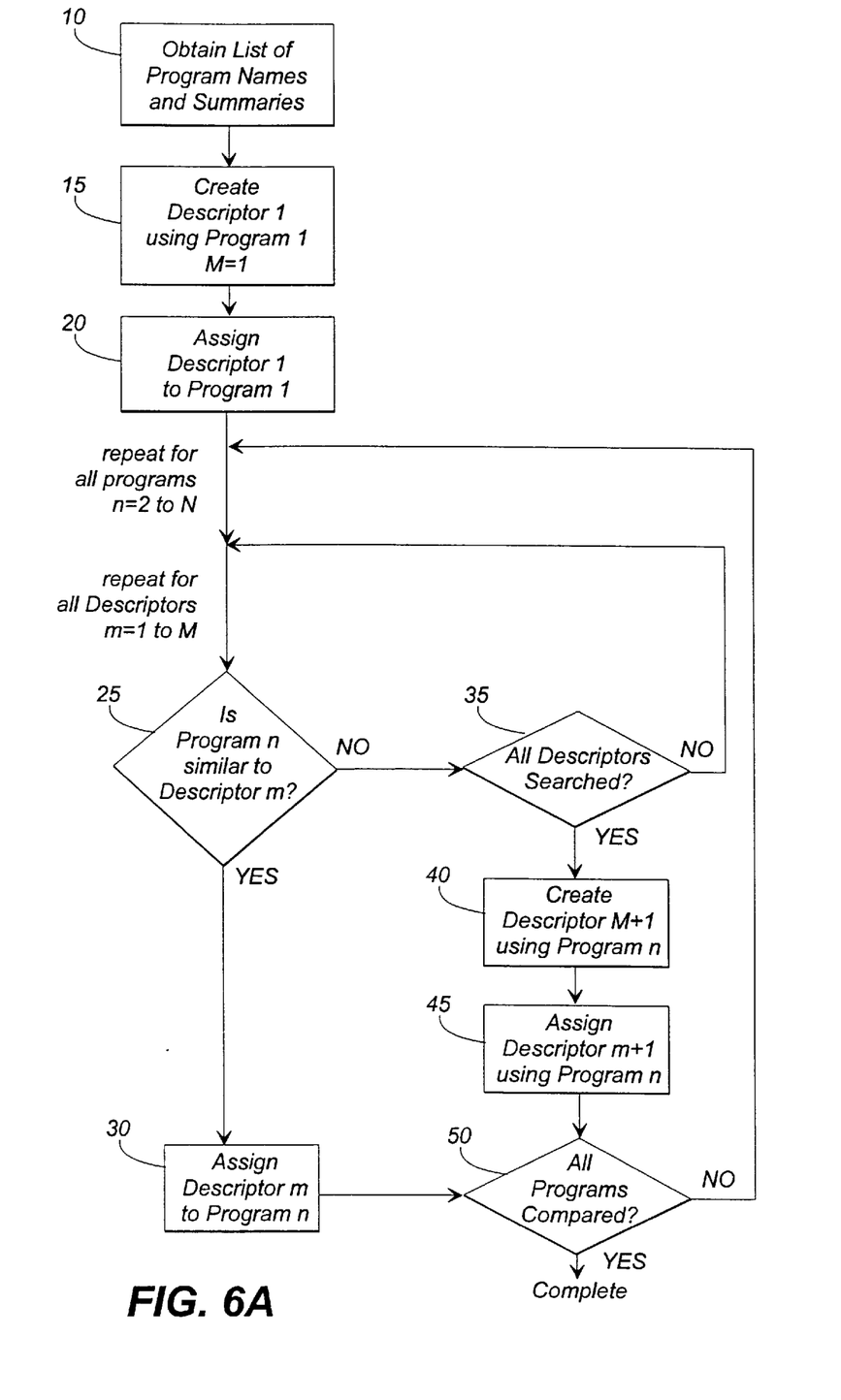
FIG. 6A is a flow chart illustrating a first process portion of the present invention.

In accordance with the methods and apparatus of the present invention, a single program descriptor is assigned to each program in the EPG data which is transmitted to the home communications terminals as described above. A relationship is then separately established between these descriptors and criteria which may be used by a subscriber to search the EPG data for programs of interest to that subscriber. Data for defining this relationship is also stored in the home communications terminal. The subscriber may then provide one or more of the above-mentioned criteria to search the EPG data for programs meeting the criteria. The programs which are determined to meet the criteria may be displayed on the television of the subscriber. The method of the present invention will be discussed with reference to FIGS. 6–8. With reference to FIG. 6A, an ordered program list is obtained (block 10). The program list at least includes program names and may further include program summaries for some or all of the programs. A first program descriptor is then created or generated using the name of the first program in the program list, e.g., "True Grit" (block 15). Of course, the present invention is not limited to this manner of creating or generating descriptors. In general, the descriptors may be any designation which is convenient for implementing the process to be described below including, but not limited to, alphanumeric strings and numbers. The first program descriptor is then assigned to the first program in the program list (block 20). Next, the second program on the program list is compared to the first descriptor and a decision is made as to whether the second program is "similar" to the program named by the first descriptor (decision block 25). The decision regarding similarity of programs may be based on program content using the program summary for the programs in the program list. For example, it may be decided that the movie western "The Unforgiven" is similar to movie western "True Grit". It may, however, be decided that the movie western "Blazing Saddles", due to its comedic elements, is not similar to the movie western "True Grit". As will be explained below, in this case, a new descriptor "Blazing Saddles" is generated. The decision at decision block 25 need not be based solely on program content, and may be further based on other considerations. For example, the decision may take into account the original program air date. For example, it may be decided that the 1990's situation comedy "Seinfeld" is similar to the 1990's situation comedy "Mad About You", but not to the 1950's situation comedy "I Love Lucy".

If, at decision block 25, it is decided that the second program on the program list is "similar" to the program named by the first descriptor, the first program descriptor is assigned to the second program (block 30) and a decision is then made as to whether all the programs in the program list have been compared to the program descriptors (decision block 50). If not, the procedure is repeated until all N programs on the program list have been processed. If so, the procedure is complete. If, at decision block 25, it is decided that the second program is not similar to the program corresponding to the first descriptor, a decision is made as to whether all the descriptors have been searched (decision block 35). Since, at this time, only one program descriptor has been generated, a new second descriptor is generated using the program name of the second program (block 40). The second descriptor is then assigned to the second program (block 45). Next, a decision is made as to whether all the programs in the program list have been compared to the program descriptors (decision block 50) as mentioned above. If not, the procedure is repeated until all N programs on the program list have been processed. If so, the procedure is complete. Thus, in short, each program on the program list is compared with the existing program descriptors to decide whether the program is similar to the program corresponding to one of the existing program descriptors. If a program under consideration is similar to the program corresponding to one of the existing program descriptors, that existing descriptor is assigned to the program. If a program under consideration is not similar to any of the programs corresponding to the existing program descriptors, a new program descriptor is created using the program name and the new program descriptor is assigned to the program. If desired, the process steps of FIG. 6A may be repeated one or more additional times to improve or reduce the set of unique program descriptors.

Figure 6B:
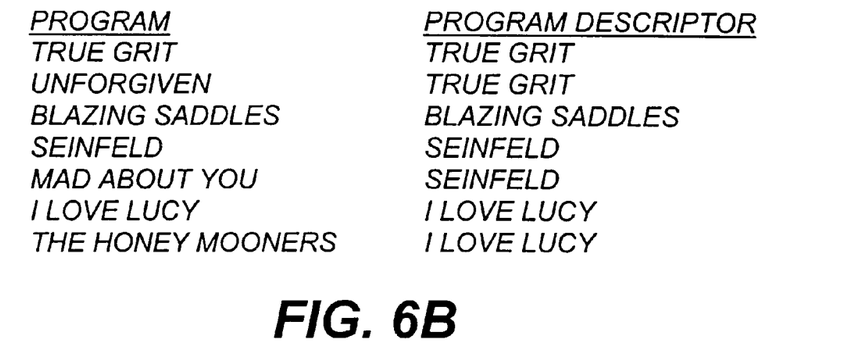
FIG. 6B is a table including data generated using the process of FIG. 6A.

As a result of the process of FIG. 6A, each program in the ordered program list is associated with a program descriptor as illustrated by the table of FIG. 6B. As seen in FIG. 6B, the program "True Grit" is associated with the program descriptor "True Grit"; the program "Unforgiven" is associated with the program descriptor "True Grit"; the program "Blazing Saddles" is associated with the program descriptor "Blazing Saddles"; the program "Seinfeld" is associated with the program descriptor "Seinfeld"; the program "Mad About You" is associated with the program descriptor "Seinfeld"; the program "I Love Lucy" is associated with the program descriptor "I Love Lucy"; and the program "The Honeymooners" is associated with the program descriptor "I Love Lucy". Of course, as noted above, each program is also associated with a program summary, a program start time, a program duration, etc.

Figure 7A:
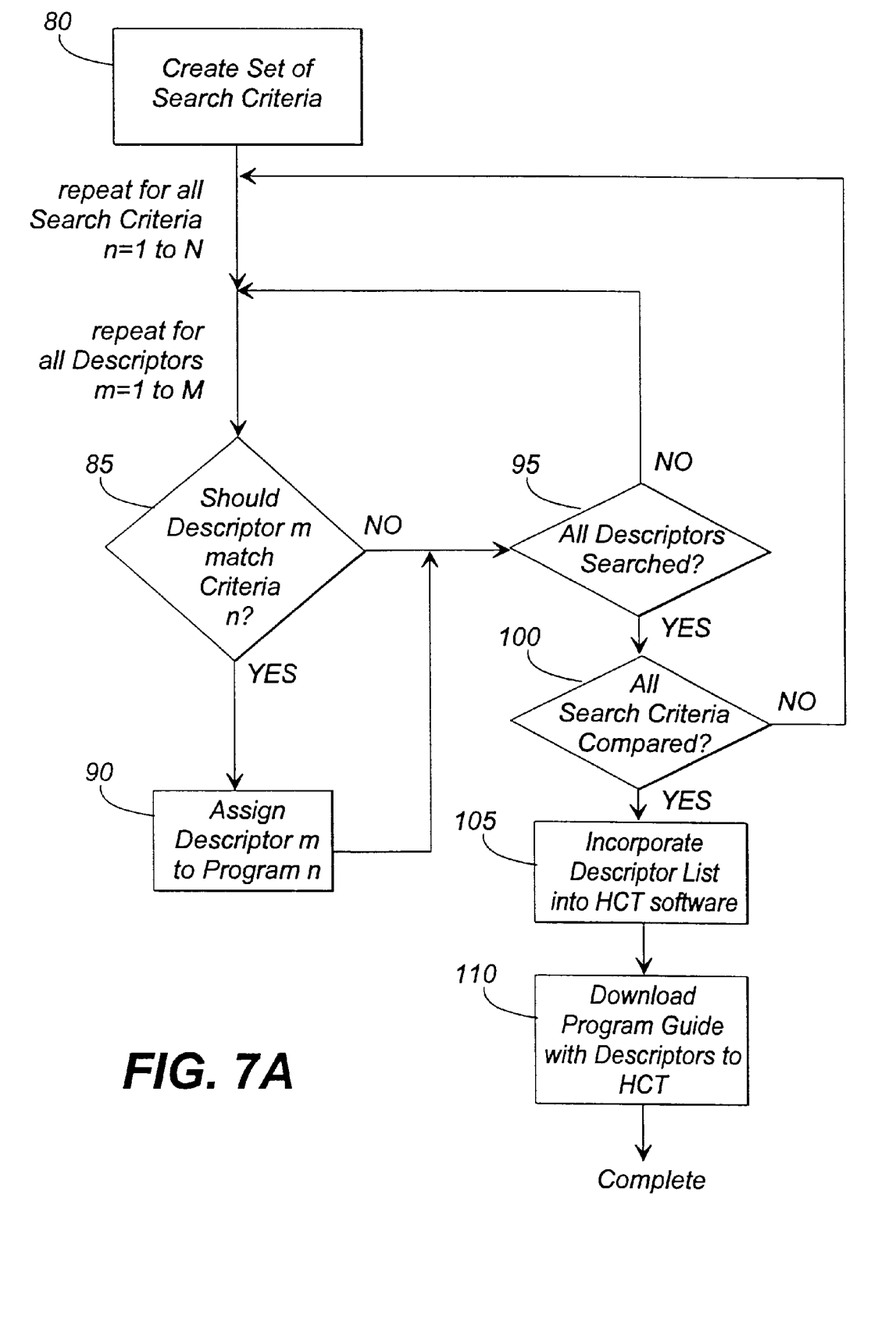
FIG. 7A is a flow chart illustrating a second process portion of the present invention.
Figure 7B:
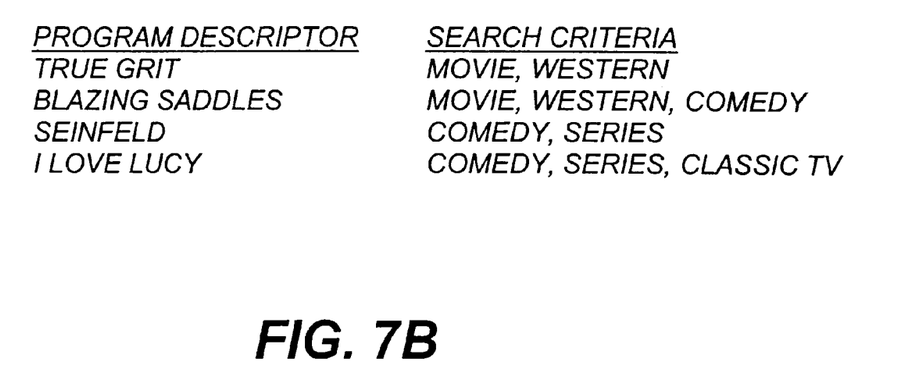
FIG. 7B is a table including data generated using the process of FIG. 7A.

The next aspect of the present invention will be described with reference to FIG. 7A. First, a set of N search criteria is created (block 80). The search criteria may include, for example, "movie"; "comedy"; "western"; "drama"; "series"; "sports"; "talk show"; "game show"; "classic TV"; etc. Then, for search criterion 1, a decision is made as to whether any of the descriptors m (where m=1 to M) should match this criterion (decision block 85). If so, descriptor m is assigned to criterion 1 (block 90). A decision is then made as to whether all of the program descriptors m have been searched (block 95). If not, the process (blocks 85, 90, and 95) is repeated until each of the remaining program descriptors have been considered. If so, a decision is made as to whether all the search criteria have been processed (block 100). If not, the above-described process is repeated for the next search criterion, Namely, a determination is made as to which of the program descriptors should be matched to this next search criterion (blocks 85, 90, and 95). When all the search criteria have been compared, a descriptor listing which relates the search criteria to the descriptors is generated and then transmitted and stored in the home communications terminals block 105). For example, the descriptor listing may be transmitted to the home communications terminal using any of the data transmission techniques described above. For example, using some descriptors and search criteria identified above as examples, the "True Grit" program descriptor should match the search criteria "movie" and "western", but not "comedy"; "drama"; "series"; "sports"; "talk show"; "game show"; or "classic TV". The "Blazing Saddles" program descriptor should match the search criteria "movie", "western", and "comedy", but not "drama"; "series"; "sports"; "talk show"; "game show"; or "classic TV". More specifically, as seen in FIG. 7B, "True Grit" is associated with the search criteria "movie" and "western"; "Blazing Saddles" is associated with the search criteria "movie", "western", and "comedy"; "Seinfeld" is associated with the search criteria "comedy" and "series"; and "I Love Lucy" is associated with the search criteria "comedy", "series", and "classic TV".

The program guide with descriptors is then downloaded to the home communications terminal (block 110) using any of the data transmission techniques described above.

At the home communications terminal, the user is provided with controls (e.g., remote control 126 or terminal keypad 122 of FIGS. 4A and 4B) which permit him/her to generate a display of programs which is limited to those programs matching specific search criteria. For example, the user may be presented with menus which permit selection of {"movies" and "comedy" and "western"} as search criteria. The selection of these criteria generates a display of programs which is limited to those programs whose descriptors are a member of the set defined by the intersection the corresponding descriptor lists. Of course, the user is also permitted to specify other search criteria such as {"movies"} or {"movies" and "comedy"} or { "movies" or "comedy"}.

Figure 8:
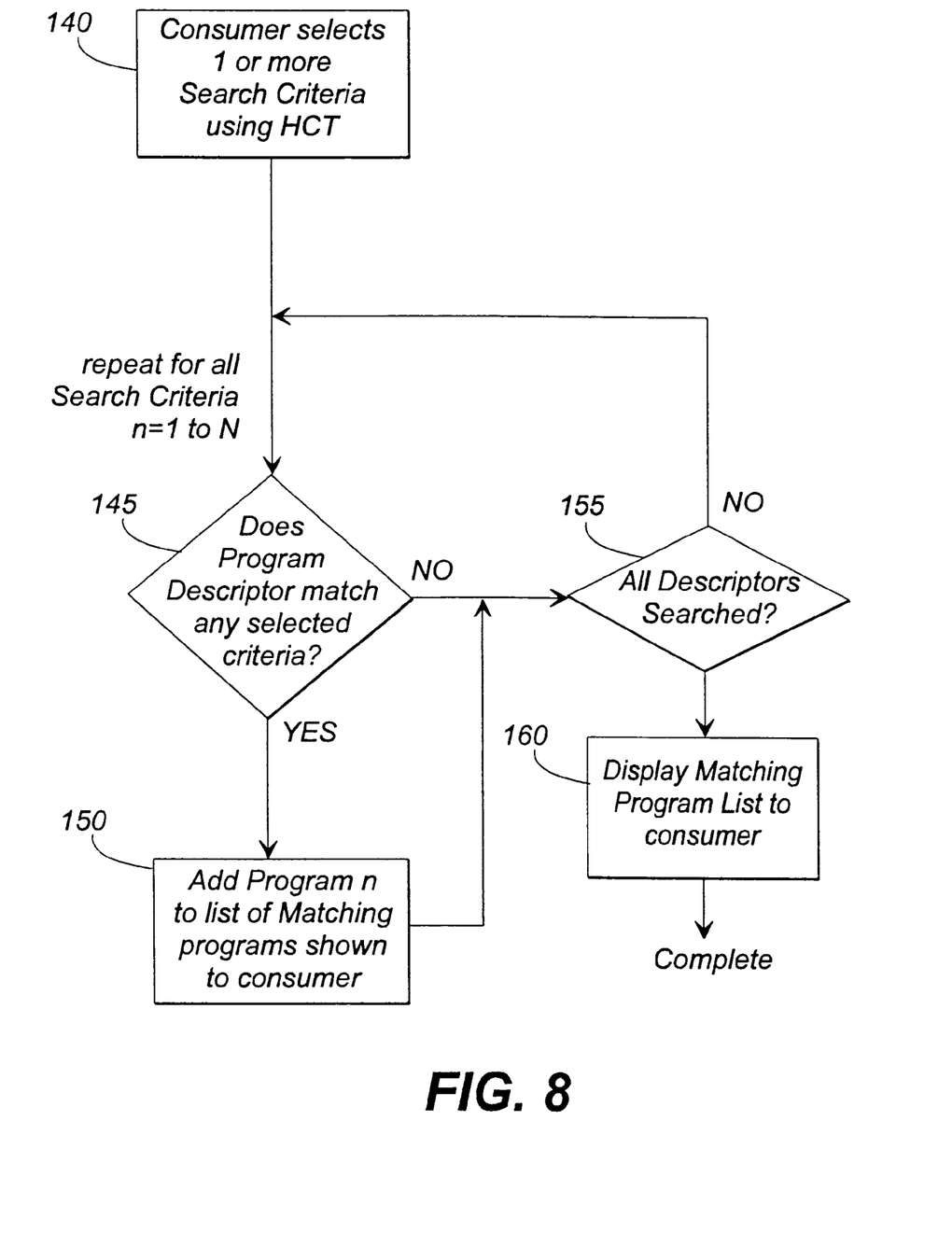
FIG. 8 is a flow chart illustrating a third process portion of the present invention.

This process will be described in greater detail with reference to FIG. 8. The user selects one or more search criterion/criteria using the user interface of the home communications terminal (block 140). For each of the programs in the program database which has been downloaded to the home communications terminal, a decision is made using the descriptor listing as to whether the program descriptor corresponding to the program matches any selected criteria (decision block 145). If so, the program is added to the list of matching programs to be shown to the user (block 150). If not, a decision as to whether all the programs have been processed is made (decision block 155). If all the programs have been processed, the program list is shown to the user (block 160). If all the programs have not been processed, the next program is processed.

Figure 9A:
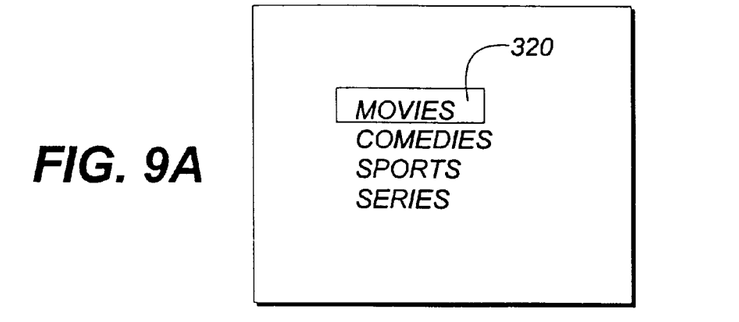
FIG. 9A–9C illustrate screens usable for selecting criteria.
Figure 9B:
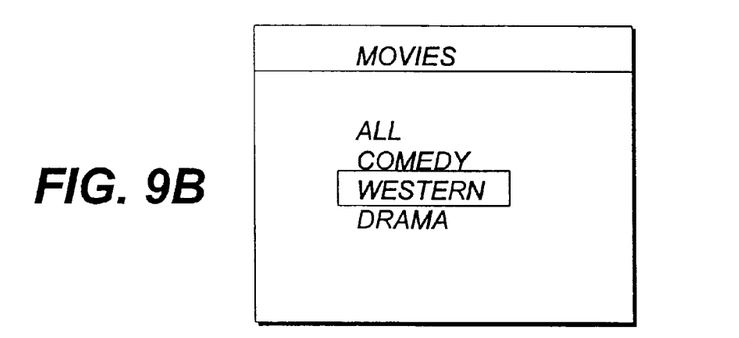
Figure 9C:
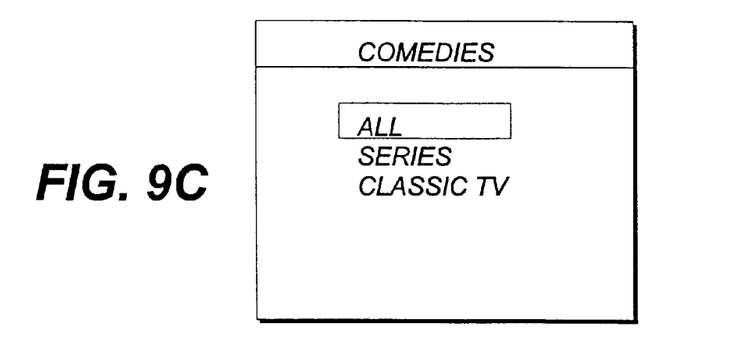
Figure 9D:
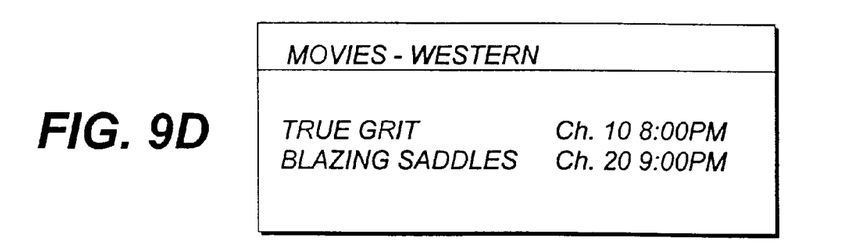
FIG. 9D is an illustration of a screen usable to display a program list of programs satisfying selected criteria.

FIGS. 9A–9C shows menu screens from which a user can select criteria to generate a program list of programs which satisfy the selected criteria. These screens are generated by home communications terminal 14 for display on a television screen such as the screen of television 20 of FIG. 3. FIG. 9A is a main menu screen setting forth the criteria "Movies", "Comedies", "Sports", and "Series". A user can use the "UP" and "DOWN" keys 234, 236 of remote control 126 to position a cursor 320 over one of the criteria. As shown in FIG. 9A, cursor 320 is positioned on the criteria "Movies". The user can select the criteria "Movies" by pressing the "SELECT" key 214 on the remote control. This action will cause the screen of FIG. 9B to be displayed to the user. The screen of FIG. 9B presents the user with criteria for selecting certain types of movies, i.e., "All", "Comedy", "Western", and "Drama". The user again uses the "UP" and "DOWN" keys 234, 236 of remote control 126 to position a cursor over one of the criteria of FIG. 9B. Pressing the "SELECT" key 214 after positioning the cursor will cause the process of FIG. 8 to be executed, resulting in the display of a program list of programs satisfying the selected criteria. For example, pressing the "SELECT" key 214 when the cursor is positioned on "Western" would result in the program list of programs which satisfy the criteria, i.e., "True Grit" and "Blazing Saddles" as shown in the program list of FIG. 9D. As shown in FIG. 9D, the channel number and start time of these movies is provided to the user. The user interface may be configured to permit the user to select the movies for viewing and/or recording. In addition, summary information for each program may be obtained by a user by positioning the cursor over a particular program and then pressing the "INFO" key 216 on remote control 126. FIG. 9C is a screen illustrating the criteria which are displayed when "Comedies" is selected from the main menu of FIG. 9A. It will be appreciated that the above-described user interface is merely illustrative of one particular user interface which can be developed for use the present invention. Modifications and variations thereof will be readily apparent. For example, the interface may be configured so as to permit a user to make more than one selection at a time from the menus of FIGS. 9B and 9C. Thus, a program list including movies which are comedies or movies which are dramas may be generated.

As an additional feature to the above-described embodiment, the user may be provided with the name of the generating program for each descriptor. For example, "The Unforgiven" would be assigned descriptor "1" for which the generating program is "True Grit". In this way, the user could request a list of all programs matching the selected descriptor.

In accordance with a second embodiment of the present invention, a list of categories is created and the list of descriptors is then formed by numbering all possible permutations of the categories. Each program could then be assigned a single descriptor based upon the categories the program matched. If the number of categories were large, this technique might generate an excessively large descriptor set. However, the descriptor set might be limited to those category combinations which could reasonably be expected in normal programming material and further might be limited to groups of five or less. Thus, movie:comedy:western would be allowed, but movie:comedy:sitcom would not since no matching programs would be expected. Movie:comedy:western:drama:action:fantasy would also be excluded since although there might be matching programs (e.g., "WestWorld"), it exceeds the maximum limit of five categories. Of course, the limitation to five categories is for exemplary purposes only and the invention is not limited in this respect.

In accordance with a third embodiment of the present invention, a descriptor bit map may be assigned to each program. For example, if there were 75 available descriptors, a 75/8=>10 byte descriptor bit map would be required for each program. In this way, each program could be assigned to an arbitrarily large number of descriptors (up to the number of available descriptors).

In accordance with a fourth embodiment of the present invention, a category tree may be generated. A unique value may then be assigned to each leaf on the category tree.

While there has been shown and described the preferred embodiments of the invention, it will be evident to those skilled in the art that various modifications may be made thereto without departing from the spirit and scope of the invention as set forth in the appended claims.

What is claimed is:

1. A method for organizing program information comprising the steps of:

obtaining a program list;

generating a first program descriptor for the first program of said program list and assigning the first program descriptor to the first program;

comparing a second program of the program list to the first program descriptor;

assigning the first program descriptor to the second program based on a first result of the comparing; and generating a second program descriptor for the second program and assigning the second program descriptor to the second program based on a second result of the comparing.

2. The method according to claim 1, wherein the program list includes program names and program summaries.

3. The method according to claim 1, wherein the first program descriptor is the title of the first program.

4. The method according to claim 1, wherein the first program descriptor is an alphanumeric program descriptor.

5. A method of organizing program information in which programs are associated with program descriptors, the method comprising the steps of:

generating a plurality of criteria;

comparing each criterion to the program descriptors;

assigning program descriptors to a criterion based on the results of the comparison; and generating a list which relates the program descriptors to the criteria.

6. The method according to claim 5, wherein the program descriptors are program titles.

7. The method according to claim 5, wherein the program descriptors are alphanumeric program descriptors.

8. A method of searching program information in which programs are associated with program descriptors, the method comprising the steps of:

generating a plurality of criteria;

comparing each criterion to the program descriptors;

assigning program descriptors to a criterion based on the results of the comparison;

generating a list which relates the program descriptors to the criteria;

supplying one or more criteria; and selecting programs based on the supplied criteria using the list.

9. The method according to claim 8, wherein the program descriptors are program titles.

10. The method according to claim 8, wherein the program descriptors are alphanumeric program descriptors.

11. A method for organizing and searching program information comprising the steps of:

obtaining a program list;

generating a first program descriptor for the first program of said program list and assigning the first descriptor to the first program;

comparing a second program of the program list to the first program descriptor;

assigning the first program descriptor to the second program based on a first result of the program to program descriptor comparison;

generating a second program descriptor for the second program and assigning the second program descriptor to the second program based on a second result of the program to program descriptor comparison;

generating a plurality of criteria;

comparing each criteria to each program descriptor;

assigning each program descriptor to a criterion based on the results of the criterion comparison;

generating a list that relates the program descriptors to the criteria;

supplying one or more criteria; and selecting programs based on the supplied criteria using the list.

12. The method of claim 11, wherein the program list includes program names and program summaries.

13. The method of claim 11, wherein the program descriptors are program titles.

14. The method of claim 11, wherein the program descriptors are alphanumeric program descriptors.

* * * * *